Patented Dec. 16, 1941

2,266,199

UNITED STATES PATENT OFFICE 2,266,199

DICYANOMETHYL CARBONATE AND METHOD OF PREPARING THE SAME

Ingenuin Hechenbleikner, Stamford, Conn., assignor to American Cyanamid Company, New York, N. Y., a corporation of Maine No Drawing. Application February 24, 1941, Serial No. 380,375

3 Claims. (Cl. 260—463)

The present invention relates to dicyanomethyl carbonate and a method of preparing the same.

The principal object of the invention is to produce the above new material in a simple manner with good yields. This new compound is useful as an insecticide and fungicide.

57 grams (1 mol) of glycolonitrile, 79 grams (1 mol) of pyridine with 100 cc. of anhydrous ether as a solvent was placed into a three-neck flask fitted with a stirrer, condenser and thermometer. 99 grams (1 mol) of phosgene was then distilled into the mixture while the latter was being stirred. The addition of the phosgene was regulated so that the temperature in the reaction flask was maintained no higher than 15° C. through external cooling with an ice bath. After all the phosgene had been added, the mixture was refluxed for three hours. At the end of this time, the contents of the flask were poured into 500 grams of a mixture of ice and ice water. A copious, white precipitate separated, which was filtered, dried and recrystallized from ethyl alcohol. Upon analysis, the compound was identified as dicyanomethyl carbonate having the following formula:

$$(CN-CH_2-O)_2C=O$$

The yield was 95% of the theoretical. The compound melts at 114° C. and is soluble in hot water and methyl alcohol.

While the invention has been described with specific reference to particular embodiments, it is to be understood that it is not to be limited thereto but is to be construed broadly and restricted solely by the scope of the appended claims.

I claim:

1. Dicyanomethyl carbonate having substantially the following formula:

$$(CN-CH_2-O)_2C=O$$

2. The method of preparing dicyanomethyl carbonate which includes the steps of reacting glycolonitrile, pyridine and phosgene in the presence of ether as the solvent, pouring the reaction mixture into ice water and recovering the precipitated dicyanomethyl carbonate therefrom.

3. A method of preparing dicyanomethyl carbonate which includes the steps of mixing glycolonitrile, pyridine and phosgene in a medium of ether as a solvent at a temperature no higher than 15° C., refluxing the reaction mixture for substantially three hours, pouring the reaction mixture into ice water and filtering off and recovering the precipitated dicyanomethyl carbonate.

INGENUIN HECHENBLEIKNER.